Figure 1:
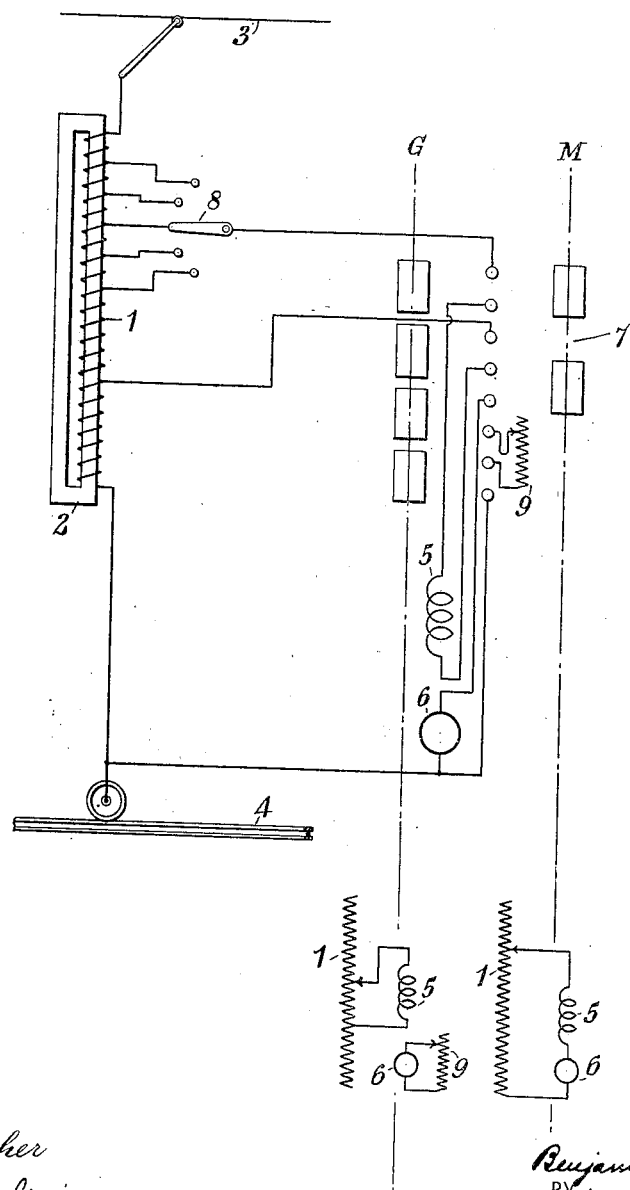

B. G. LAMME.
METHOD OF AND MEANS FOR OPERATING DYNAMO ELECTRIC MACHINES.
APPLICATION FILED AUG. 2, 1906.

925,355.

Patented June 15, 1909.
3 SHEETS—SHEET 1.

WITNESSES:
C. L. Belcher
Otto S. Schairer

INVENTOR
Benjamin G. Lamme
BY
Wheley G. Carr
ATTORNEY

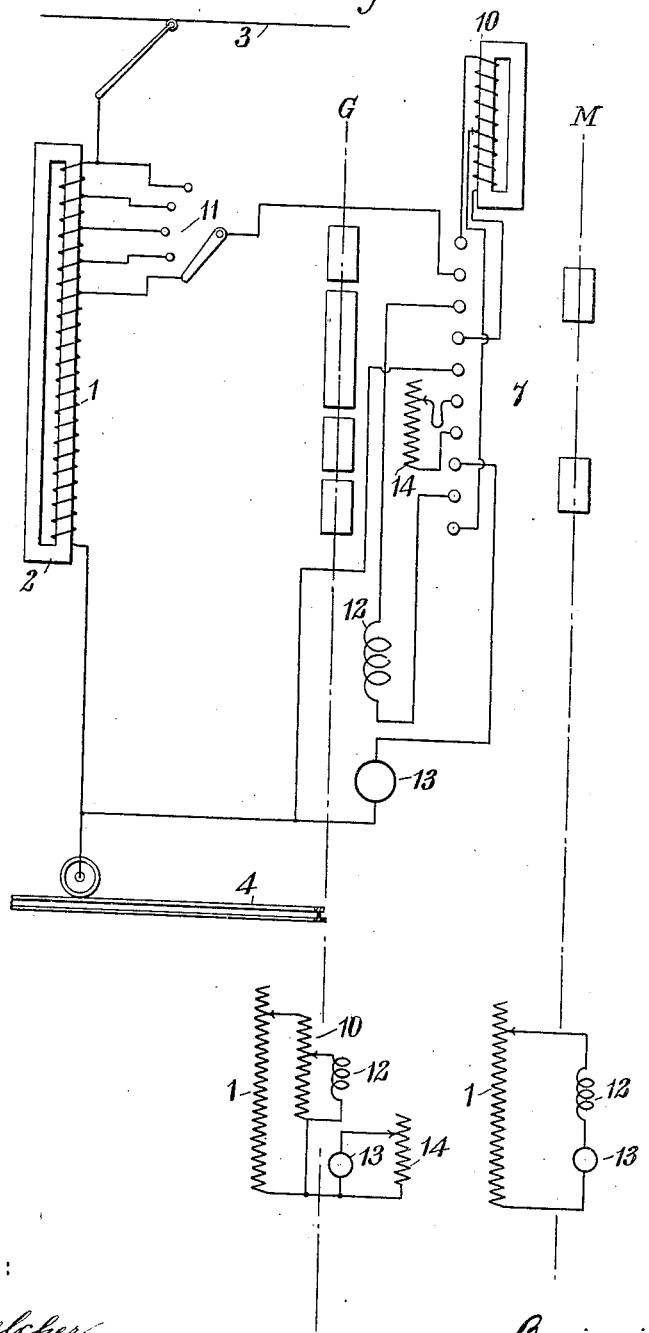

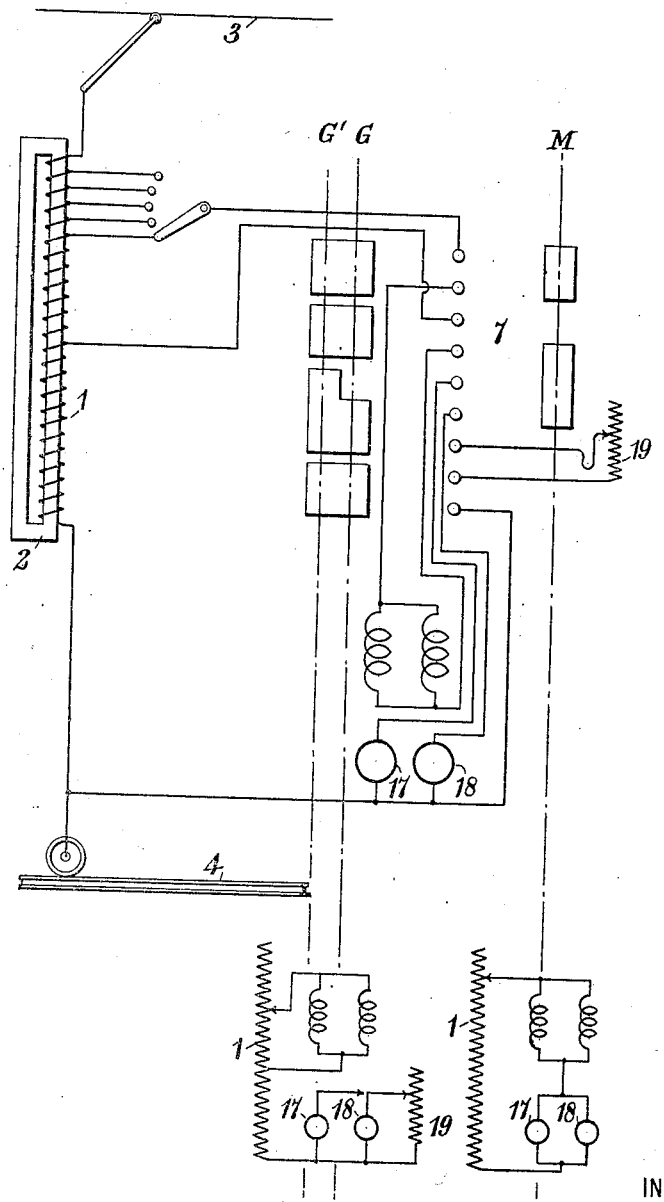

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

METHOD OF AND MEANS FOR OPERATING DYNAMO-ELECTRIC MACHINES.

No. 925,355.   Specification of Letters Patent.   Patented June 15, 1909.

Application filed August 2, 1906. Serial No. 328,869.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Methods of and Means for Operating Dynamo-Electric Machines, of which the following is a specification.

My invention relates to methods of operating dynamo-electric machines either as motors or as generators, and to means for practicing such methods.

The object of my invention is to provide a method of, and means for, operating alternating current motors of the commutator type, that are employed to propel vehicles and the like, whereby they may be caused to act as braking generators.

In the operation of electric railway vehicles the propelling motors are frequently employed as braking generators, but since the field magnet and armature windings thereof are usually connected in series relation, they have not heretofore operated as generators under stable conditions. In order to obtain stable or controllable conditions of operation, the field magnet strengths must remain invariable or be subject to variation by an operator, as is the case when the field magnet winding is separately excited. Separate excitation of the field magnet winding of a direct current motor is impracticable, because of the extremely large resistances necessary to reduce the voltage of the supply circuit to that suitable for application to the field magnet winding. When alternating current motors of the commutator type of construction are employed to propel a vehicle, however, and the voltages applied thereto are varied by altering the active length of a transformer winding in circuit therewith, I propose to separately excite the field magnet windings of the motors, when operating as generators, by connecting them directly to the transformer winding, and to vary the field magnet strengths by altering the points of connection of the field magnet windings with the transformer winding. In the present instance, the armatures are connected in a circuit including either a braking resistance or the winding of a mechanical brake. In another application, Serial No. 401,325, which is a division of the present application, one of the propelling motors is utilized as an exciter for the field magnet windings of the remaining motors, the field magnet winding of the exciter and the armatures of the remaining motors being connected to the distributing circuit, and in still another application, Serial No. 401,324, which is also a division of this application, the field magnet and armature windings of the motor remain connected in series for generator operation, but the armature of a separate commutator generator is connected in shunt to the field magnet winding, the field magnet winding of the generator being connected to the distributing circuit.

Figure 1, of the accompanying drawings, is a diagrammatic view of a system of distribution that embodies my invention, and Figs. 2 and 3 are similar views of modifications of the system of Fig. 1.

A winding 1 of an auto-transformer 2 may be supplied with alternating current from any suitable supply circuit such as that which comprises a trolley conductor 3 and a track rail 4, and the connections thereto, and the circuit arrangements of field magnet winding 5 and armature 6 of a motor of the commutator type may be adjusted by means of a controller 7 that is adapted to occupy the one or the other of the positions indicated by broken or dotted lines G and M. The circuit arrangements corresponding to each of the positions are indicated diagrammatically at the lower extremities of the broken lines. When the controller occupies the position indicated by the line M, the field magnet and armature windings of the motor are connected in series relation, as is usual when motors are employed for the propulsion of vehicles, speed variation being effected by adjustment of the voltage applied to the motor by means of an auxiliary controller 8. If it is desirable to employ the motor as a braking generator, as, for instance, when stopping a vehicle or when a vehicle is descending a grade, the controller may be caused to occupy the position indicated by the line G, whereupon the field magnet winding 5 becomes connected to the transformer winding and the armature 6 to a suitable braking resistance 9, as indicated by the diagram at the lower extremity of the line G. The degree or amount of braking afforded by the motor, when operating thus as a generator, may be adjusted by varying the amount of resistance 9 included in series with the armature 6, or by varying the field strength. Variation of the field strength may be accomplished by adjusting the voltage applied to the field magnet winding 5, as, for instance, by means of the controller 8, or, if desired, it may be effected by means of a rheostat or by a variable choke coil, the former means being preferred because the waste of energy incident to its use is practically negligible.

It may be found in practice that, with the arrangement of Fig. 1, the voltage gradations desirable for effecting speed variation of the motor will be unsuitable for effecting variation of the field strength, and for that reason an auxiliary transformer 10 (Fig. 2) of substantially the same voltage as that of the motor may be connected between an auxiliary controller 11 and the grounded terminal of the main transformer winding 1, when the motor is operated as a generator, and field magnet winding 12 may be connected between suitable points thereof, armature 13 being connected as before to a braking resistance 14. The circuit arrangements are shown diagrammatically at the lower extremity of the line G of Fig. 2 and are brought about when the controller occupies the position indicated by that line. The voltage applied to the field magnet winding may then be adjusted by means of the controller 11, and, if desired, also by altering the points of connection of the field magnet winding with the auxiliary transformer winding 10.

The invention may also be employed as indicated in Figs. 1 and 2 with more than one motor, in which case braking may be effected gradually, if desired, by connecting armatures 17 and 18 of the motors in succession to the braking resistance substantially as indicated in Fig. 3, in which the controller 7 is adapted to occupy two positions that are indicated respectively by the lines G and G'. When the controller occupies position G only the armature 18 is connected to braking resistance 19, and when it occupies the position G' the armature 17 is also connected to the braking resistance.

It will, of course, be understood that the devices 9, 14 and 19 may also represent the operating or controlling windings of mechanically applied brakes of any of the suitable well known forms.

Not only are there advantageous results incident to the use of a generator of the commutator type as above set forth for exciting the field magnet winding of another dynamo-electric machine when operating as a generator, but if the field magnet winding is similarly excited when the machine is operating as a motor, the inductive load upon the distributing circuit may be considerably less than when the said winding is supplied directly from the distributing circuit. While the power factor of the current supplied from the distributing circuit to the field magnet winding of the exciter generator is very low, it may be arranged, as for instance by operating the exciter at a comparatively high speed, so that the amount of current may be small as compared with that required of the armature for exciting the field magnet winding of the motor, which is also of a very low power factor. Thus the total inductive load upon the distributing circuit may be less than when no auxiliary generator is employed. It will, of course, be understood that the series characteristic of the motor is not retained in this arrangement, and that it will tend to run at a constant speed. However, speed variation may be readily effected by adjusting the field strength of the motor.

I claim as my invention:

1. The combination with a distributing circuit, a dynamo-electric machine, and a resistance, of means for connecting the field magnet and armature windings of the machine to the circuit and in series relation for operation thereof as a motor, and for connecting the field magnet winding to the circuit, and only the armature winding in closed circuit with the resistance, for operation of the machine as a generator.

2. The combination with a distributing circuit, a motor having series-connected field magnet and armature windings, and a resistance, of means for connecting the field magnet winding of the motor to the circuit, and only the armature winding in closed circuit with the resistance, for operating the motor as a generator.

3. The combination with a distributing circuit, a plurality of motors having series-connected field magnet and armature windings and a resistance, of means for connecting the field magnet windings of the motors to the circuit, and only the armature windings in succession to the resistance, for operation of the motors as generators.

4. The combination with a distributing circuit, a motor having series-connected field magnet and armature windings and a resistance, of means for connecting the field magnet winding of the motor to the circuit, and only the armature winding in closed circuit with the resistance, and means for varying the field magnet strength, when operating the motor as a generator.

5. The method of operating as a generator a motor having series-connected field magnet and armature windings which consists in supplying the field magnet winding from the circuit from which the motor is supplied and in connecting only the armature in closed circuit with a resistance.

6. The method of operating as a generator a motor having series-connected field magnet and armature windings which consists in supplying the field magnet winding from the circuit from which the motor is supplied, in connecting the armature to a resistance, and in varying the field magnet strength.

7. The method of operating a plurality of motors as braking generators which consists in causing them to become generators in succession.

8. The combination with a plurality of dynamo-electric machines that may be operated as braking generators, of means for connecting the machines successively in the braking circuit.

9. The method of operating as generators a plurality of motors having series-connected field magnet and armature windings which consists in supplying the field magnet windings of the machines from the circuit that supplies the motors and connecting the armatures in succession to a resistance.

In testimony whereof, I have hereunto subscribed my name this 28th day of July, 1906.

BENJ. G. LAMME.

Witnesses:
OTTO S. SCHAIRER,
BIRNEY HINES.